(12) United States Patent
Brown

(10) Patent No.: US 6,610,138 B1
(45) Date of Patent: Aug. 26, 2003

(54) METHOD OF RESISTING CORROSION IN METAL REINFORCING ELEMENTS CONTAINED IN CONCRETE AND RELATED COMPOUNDS AND STRUCTURES

(76) Inventor: Paul W. Brown, 352 E. Irvin Ave., State College, PA (US) 16801

( * ) Notice: Subject to any disclaimer, the term of this patent is extended or adjusted under 35 U.S.C. 154(b) by 0 days.

(21) Appl. No.: 10/010,581

(22) Filed: Nov. 13, 2001

(51) Int. Cl.⁷ .................. C04B 14/48; C04B 14/00; C04B 22/06
(52) U.S. Cl. .................. 106/640; 106/641; 106/642; 106/643; 106/644
(58) Field of Search .................. 106/640, 641, 106/642, 643, 644

(56) References Cited

U.S. PATENT DOCUMENTS

| | | | |
|---|---|---|---|
| 3,668,150 A | * 6/1972 | Horvitz | .................. 106/643 |
| 4,092,109 A | 5/1978 | Rosenberg et al. | |
| 4,285,733 A | * 8/1981 | Rosenberg et al. | ......... 106/640 |
| 4,365,999 A | * 12/1982 | Fujita et al. | ................ 106/644 |
| 5,049,412 A | 9/1991 | Miller | |
| 5,127,954 A | * 7/1992 | Johnston et al. | ............ 106/644 |
| 5,198,082 A | 3/1993 | Vennesland et al. | |
| 5,422,141 A | 6/1995 | Hoopes et al. | |
| 5,435,846 A | 7/1995 | Tatematsu et al. | |
| 5,597,514 A | * 1/1997 | Miksic et al. | |
| 5,634,966 A | * 6/1997 | Berke et al. | ............. 106/14.41 |
| 6,402,990 B1 | 6/2002 | Marazzani et al. | |

FOREIGN PATENT DOCUMENTS

| | | |
|---|---|---|
| CA | 1 258 473 | 8/1989 |
| JP | 09 286652 | 11/1997 |

OTHER PUBLICATIONS

Kashima, Abstract of JP 09049796, Sep. 1998.*
Kajima, Abstract of JP 09286652, Feb. 1996.*
Clements Research Progress 1989, The American Ceramic Society, pp. 137, 148, 155.
Clements Research Progress 1993, The American Ceramic Society, pp. 127–128, 137, 144–145.
Clements Research Progress 1994, The American Ceramic Society, pp. 133,134, 142, 146.
Clements Research Progress 1995, The American Ceramic Society, pp. 155–156, 167, 171.
Clements Research Progress 1996, The American Ceramic Society, pp. 131,132, 143–144, 148.
Clements Research Progress 1997, The American Ceramic Society, pp. 134–135, 146–148, 151–152.

* cited by examiner

Primary Examiner—Elizabeth D. Wood
(74) Attorney, Agent, or Firm—Arnold B. Silverman; Debra Z. Anderson; Eckert Seamans Cherin & Mellott, LLC

(57) ABSTRACT

A method of resisting corrosion in concrete containing metal elements is provided. It includes introducing into fresh concrete, containing metal elements, at least one compound capable of sequestering chloride ions. The method may also involve employing a compound which is capable of establishing a corrosion resistant oxide layer on the metal reinforcing elements. The invention also includes certain compounds which may be employed in the method as well as concrete structures containing the compounds.

21 Claims, 1 Drawing Sheet

METHOD OF RESISTING CORROSION IN METAL REINFORCING ELEMENTS CONTAINED IN CONCRETE AND RELATED COMPOUNDS AND STRUCTURES

BACKGROUND OF THE INVENTION

1. Field of the Invention

The present invention relates to a method of introducing into fresh concrete, as herein defined, compounds capable of sequestering chloride ions to establish resistance to corrosion of metal reinforcing elements contained within or contacting the concrete and provide a corrosion resistant oxide layer on the metal reinforcing elements, as well as related compositions and structures.

2. Description of the Prior Art

The advantageous use of metal reinforcing members, such as steel reinforcing members, in concrete for structural uses has been known for many years. Concrete is known to provide desired compressive strength, but tends to lack tensile strength. The reinforcing bars co-act with the concrete to provide enhanced tensile strength for the combination of materials. It has also been known to employ corrugated metal deck in combination with concrete to create a composite with similar benefits. Numerous other metal members have been embedded in concrete or provided in contact therewith to achieve enhanced benefits in the structural environment as a result of such materials. Among these additional materials are grids, beams, bolts, hold-downs and wire mesh.

One problem with such construction has arisen as a result of exposure of concrete to salts, such as calcium chloride and sodium chloride, on external structural members to resist the undesired accumulation of snow and ice on bridges and other concrete paved areas such as roadways, parking lots, sidewalks and the like. While these chloride salts do provide benefits in terms of de-icing of concrete surfaces, they frequently result in the chloride solutions migrating into the concrete decks and adjacent vertical concrete surfaces, such as walls and columns, also subjecting these to chloride intrusion. Also, saline seawater may migrate into the pores of concrete exposed to seawater as in sea walls, With respect to bridge decks, in particular, an enhanced problem results from air movement under the deck creating an environment wherein the salts are aspirated into the concrete and salt laden solutions flow into the pores.

Regardless of the manner in which chloride enters such concrete, the chloride, upon reaching the steel reinforcing members, tends to accelerate corrosion of the same because the oxidation of the metal metallic iron to $Fe^{2+}$ is catalyzed by the chloride. Also, oxides and hydroxides of $Fe^{2+}$ frequently form and occupy porosity in the vicinity of the interface of the steel and concrete. In addition, oxides and hydroxides of $Fe^{3+}$ may also be produced. As these iron oxides and hydroxides are of greater volume than the iron metal from which they were produced, they tend to cause internal stresses which may become high enough to crack the concrete, and also degrade the desired bond between the metal reinforcing elements and the concrete.

It has been known to employ nitrites, such as calcium nitrite, in resisting corrosion of steel parts in concrete. It is believed that the nitrites oxidize the $Fe^{2+}$ to $Fe^{3+}$ which, in turn, precipitates as $Fe_2O_3$. The $Fe_2O_3$ thus formed tends to act as a barrier to further contact between the chloride and the steel. See, generally, U.S. Pat. Nos. 4,092,109 and 4,285,733. Neither calcium nitrate nor $Fe_2O_3$, however, function to sequester chloride. The latter provides merely a barrier.

There remains, therefore, a very real and substantial need for a method and related composition and structure which will resist undesired corrosion of metal structural elements contained within, or in contact with, concrete structural members.

SUMMARY OF THE INVENTION

The present invention has met the above-described need.

The method, in one embodiment, includes resisting corrosion in concrete containing metal reinforcing elements composed of steel, copper, galvanized steel, tin plated steel or other structurally suitable metals by introducing into fresh concrete containing metal reinforcing elements at least one compound capable of sequestering chloride ions in a low solubility compound.

In connection with steel reinforcing elements, a low solubility compound within which the chloride ions are sequestered preferably also is created in a reaction that releases nitrite, which serves to oxidize $Fe^{2+}$ to thereby provide a corrosion-resisting oxide layer on the steel reinforcing elements. This, therefore, in connection with steel achieves two levels of corrosion resistance, one of which is the actual capturing or sequestering of the potentially damaging chloride ions, and the second of which provides a protective layer on the metal reinforcing elements.

Among the preferred compounds for use in the method of the present invention are one or more compounds selected from the group consisting of $3CaO.Al_2O_3.Ca(NO_2)_2.nH_2O$; $3CaO.Al_2O_3.Ca(NO_3)_2.nH_2O$; and $3CaO.Fe_2O_3.Ca(NO_2)_2.nH_2O$; wherein n=0 to 18 and preferably 10 to 18, depending upon the relative humidity to which a compound is equilibrated. If desired, lower values of "n" may be obtained by drying at low relative humidity as by evacuation or by heating, for example.

A further compound employed in another embodiment of the invention is, $3Me(II)O.R_2O_3.Me(II)(anion)_2.nH_2O$ wherein Me(II) is one or more divalent cations, such as Ca for example, $R_2$ is $Al_2$, $Fe_2$ or $Cr_2$ anion is $NO_2$, $NO_3$, $CO_3$, $BO_4$ or OH and n is 0 to 24, and preferably 10 to 24. For some formulations, the anion may be divalent. In this case the formula would be $Me(II)O.R_2O_3.Me(II)(anion)nH_2O$ wherein n is 0 to 18 and preferably 10 to 18.

The invention also contemplates a concrete structure which has hydrated fresh concrete and a plurality of metal structural elements in contact with the hydrated fresh concrete with a compound which sequesters chloride ions dispersed within the concrete.

It is an object of the present invention to provide a method and related compounds and structures for inhibiting corrosion of metal elements positioned within or in contact with concrete in a structural environment.

It is a further object of the present invention to provide such a system wherein undesired chloride ions will, as a result of a reaction, be sequestered, thereby reducing their ability to corrode the metal elements.

It is yet another object of the invention to, through a reaction effecting such sequestration of ions, to provide free nitrites which will oxidize the $Fe^{2+}$ to a $Fe^{3+}$ ion which, in turn, precipitates as $Fe_2O_3$ which coats the metal element and, thereby, resists corrosion.

It is yet another object of the present invention to provide such a system which employs unique compounds.

It is another object of the present invention to provide such a system which will effectively and rapidly provide corrosion resistance to steel and other metals.

It is yet another object of the invention to provide such a system which may be employed by merely adding one or more compounds of choice to fresh concrete without requiring substantial changes in conventional practices employed in producing and placing the concrete structure.

These and other objects of the invention will be more fully understood from the following description of the invention with reference to the drawings appended hereto.

DESCRIPTION OF THE PREFERRED EMBODIMENT

Figure 1:
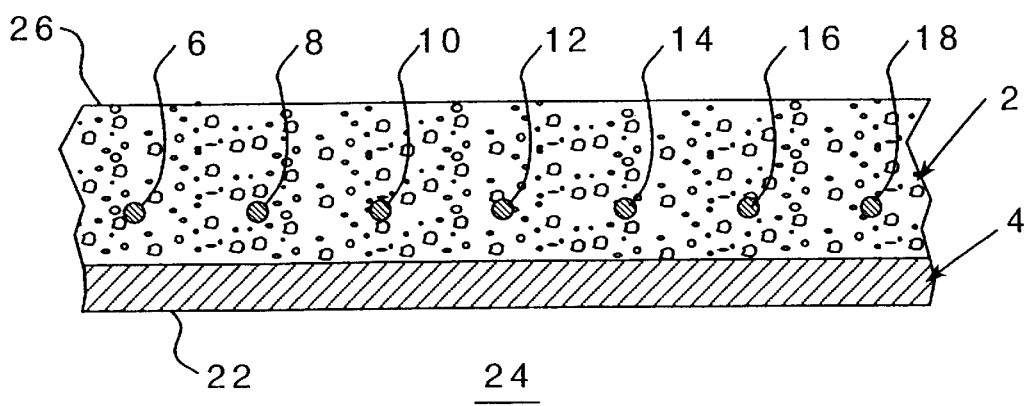
FIG. 1 is a schematic cross-sectional illustration of a concrete bridge deck containing metal reinforcing elements.

As employed herein, the term "fresh concrete" means concrete which is in a plastic state.

As employed herein reference to "introducing" a compound into fresh concrete shall be deemed to include introducing the compound in solid form and in slurry form with or without other ingredients such as minerals and additives into fresh concrete and shall also embrace admixing or blending the composition in dry form with dry cement and/or other ingredients prior to water being added.

As employed herein, the term "metal elements" means metal elements placed within or in contact with concrete for various purposes including, but not limited to, structural purposes and shall expressly include, but not be limited to, reinforcing bars, grills, beams, metal deck hold downs and wire mesh.

As shown schematically in FIG. 1, a layer of concrete 2, overlies and is supported by a deck member 4. The concrete in the form shown has a plurality of elongated, generally parallel, reinforcing bars 6, 8, 10, 12, 14, 16, 18. This assembly may be created in a conventional manner to provide the desired structure which, in the form shown, may be a bridge deck having an undersurface 22, exposed to air 24 and an upper surface 26, which may have undesired snow deposited thereon or ice formed thereon. Application of calcium chloride, sodium chloride or other chloride containing salts to the upper surface 26, or the overlying ice and snow (not shown) results in chloride penetration into the concrete interior and, if not inhibited, contact with the metal reinforcing bar 6–18 (even numbers only) which will generally be composed of steel to create the undesired corrosion.

For convenience of reference herein, the use of metal elements such as steel reinforcing bars 6–18 (even numbers only) will be discussed. It will be appreciated that corrosion inhibition of other types of metal elements such as those made of or coated with copper, tin or zinc, for example, may benefit from the present invention.

In one embodiment of the invention, there is not only provided free nitrite, which oxidizes ferrous ($Fe^{2+}$) to ferric ($Fe^{3+}$) ion to thereby effect precipitation of $Fe_2O_3$ to form an iron oxide barrier, but also provides means to sequester chloride which enters the concrete porosity by capturing the same in low solubility compounds.

As employed herein the term "low-solubility compounds" means, chloride-containing compounds exhibiting solubilities substantially below those of sodium chloride or calcium chloride, and shall include, but not be limited to, chloride-containing compounds, which at saturation in aqueous solutions permit less than about 1 kg of soluble chloride per cubic meter of concrete. A chloride level of about 1 kg/m$^3$ is considered the threshold level for corrosion.

In general, the invention contemplates the addition of any compound into which chloride ions would enter to produce a low solubility compound that sequesters the chloride.

An example of a preferred reaction of the present invention, which accomplishes both the objective of creating an iron oxide barrier and the sequestering of chloride, is shown in reaction (1).

$$3CaO.Al_2O_3.Ca(NO_2)_2.nH_2O+2Cl^- \rightarrow 3CaO.Al_2O_3.CaCl_2.nH_2O+2NO_2^- \quad (1)$$

In this example $3CaO.Al_2O_3.Ca(NO_2)_2.nH_2O$ wherein n=10 is added to fresh concrete as a particulate solid. The reaction that occurs is the chloride from the de-icing salts used on the hardened concrete reacts to produce Friedel's salt, which sequesters the chloride and, in addition, serves to release nitrite in order to oxidize any $Fe^{2+}$. In adding the particulate compound, $3CaO.Al_2O_3.Ca(NO_2)_2.nH_2O$, is added to the fresh concrete, it is preferred that in general about 3 to 88 pounds of the particulate solid will be added per cubic yard of hydrated fresh concrete, and preferably about 22 to 66 pounds per cubic yard. The exact amount will be influenced by the anticipated rates of chloride ingress into the concrete having the usual range of water-to-cement ratios, e.g., 0.35 to 0.50. The admixture may, if desired, be employed in concrete having lower water-to-cement ratios such as 0.25 to 0.35, for example, or higher ratios such as 0.5 to 0.9, for example. In general, the higher the anticipated rate of chloride ingress, the larger the amount of particulate composition employed. The compound is admixed with the hydrated fresh concrete to achieve substantially uniform distribution thereof. When the concrete sets, this constituent will be present in the concrete to receive and interact with chlorine from the icing salts that penetrates the pores of the concrete. This compound ($3CaO.Al_2O_3.Ca(NO_2)_2.nH_2O$) is generally stable over the range of pH values normally encountered in concrete. The resultant compound $3CaO.Al_2O_3.CaCl_2.10H_2O$ is a low solubility compound within which the chloride is sequestered. This compound, is more stable than the nitrite. Chloride will exchange for the nitrite thereby freeing the nitrite and sequestering the chloride. As a result, the concentration of chloride in the concrete at the surface of the steel, such as re-bars 6–18 (even numbers only) will be reduced as compared with concrete not containing the compound. This same reaction may be employed with the same result substituting $Fe_2O_3$ for $Al_2O_3$ in the starting material. This would result in the reaction $3CaO.Fe_2O_3.Ca(NO_2).nH_2O+2Cl^- \rightarrow 3CaO.Fe_2O_3.CaCl_2.nH_2O+2NO_2^-$.

In lieu of providing the compound such as $3CaO.Al_2O_3.Ca(NO_2)_2.nH_2O$ in dry particulate form, it may be presented as a slurry with a pH of about 10 or greater with the particulate being present in the slurry in the range of about 5 to 60 weight percent and preferably about 10 to 35 weight percent. The slurry then would be admixed with the hydrated fresh concrete.

In lieu of introducing the particulate solid or slurry into hydrated fresh concrete, if desired, one may admix the particulate solid or slurry with one or more of the dry components of the concrete such as the cement, for example.

In lieu of the compound employed in reaction (1), other compounds may be used to create essentially the same reaction with the following differences. Among these compounds are, $3CaO.Fe_2O_{3.Ca(NO2)}{}_2.nH_2O$ wherein n=0 to 24;

$3CaO.Al_2O_3.Ca(NO_3)_2.nH_2O$ wherein n=0 to 24;

and $3CaO.Fe_2O_3.Ca(NO_3)_2.nH_2O$ wherein n=0 to 24.

Also, $3Me(II)O.R_2O_3.Me(II)(anion)_2.nH_2O$ wherein Me(II) is one or more cations, $R_2$ is $Al_2$, $Fe_2$ or $Cr_2$, anion is $NO_2$, $NO_3$ or OH and n=0 to 24 may be employed. These approaches, in many instances, involve a substitution in the compound employed in equation (1) for the aluminum, for the calcium or the nitrite. As to the substitution for the nitrite, this would be replaced by nitrate in equation (1) $3CaO.Fe_2O_3.Ca(NO_3)_2.nH_2O$ or $(3CaO.Al_2O_3.Ca(NO_2))_2.nH_2O$. As stated hereinbefore, the anion may be divalent in which case the formula would be $3Me(II)O.R_2O_3.Me(II)(anion)nH_2O$ wherein n is 0 to 18 and preferably 10 to 18. In other compositions, nitrite could be replaced by carbonate, borate or other anions.

The nitrites have the advantage of sequestering chloride in addition to liberating a species capable of rapidly oxidizing ferrous ($Fe^{2+}$) ions near the surface of corroding seal to ferric ($Fe^{3+}$) ions to facilitate the formation of a protective layer of ferric oxide or hydroxide on the steel.

It is understood that the value of "n", meaning the number of waters of hydration, may vary, depending on the relative humidity to which the compounds are exposed.

Among the preferred compounds for use in the invention are, $3CaO.Al_2O_3.Ca(NO_2)_2.nH_2O$ and $3CaO.Fe_2O_3.Ca(NO_2)_2.nH_2O$ in terms of effectiveness for both chloride sequestration in concrete and protective oxide layer formation of metal embedded or in contact with concrete. It is preferred that n=0 to 24.

EXAMPLE 1

In order to provide more detailed information regarding the manner of synthesizing the compounds, examples will be provided.

In the synthesis of $3CaO.Al_2O_3.Ca(NO_2)_2.nH_2O$ wherein n=0 to 24, the following procedure may be followed.

In employing $3CaO.Al_2O_3$ the following process of synthesis may be employed:

(a) $3CaO.Al_2O_3 + Ca(NO_2)_2(aq) \xrightarrow{H_2O} 3CaO.Al_2O_3.Ca(NO_2)_2.nH_2O$ (b) $3CaO.Al_2O_3 + 2NaNO_2(aq) + Ca(OH)_2 \xrightarrow{H_2O} 3CaO.Al_2O_3.Ca(NO_2)_2.nH_2O + 2NaOH(aq)$.

In employing $CaO.Al_2O_3$ the following process of synthesis may be employed:

(a) $CaO.Al_2O_3 + Ca(NO_2)_2(aq) + 2Ca(OH)_2 \xrightarrow{H_2O} 3CaO.Al_2O_3.Ca(NO_2)_2.nH_2O$ (b) $CaO.Al_2O_3 + 2Na(NO_2)_2(aq) + 3Ca(OH)_2 \xrightarrow{H_2O} 3CaO.Al_2O_3.Ca(NO_2)_2.nH_2O + 2NaOH(aq)$ The presence NaOH does not appear to interfere with sequestration of chloride or with the action of nitrite on steel and, as a result, it is not necessary to remove the NaOH by washing the product compounds. Alternatively, the $3CaO.Al_2O_3$ and $Ca(NO_2)_2.nH_2O$ can be crystallized and separated from the NaOH solution.

In each of these two examples, the $Ca(OH)_2$ and calcium aluminate were employed as fine powders. $Ca(NO_2)_2$ and $NaNO_2$ are commercially available and highly soluble in water. While there are no critical particle size distributions, in general, it is preferred to have a particle size such that 99% of the powder passes through a 325 mesh sieve.

Commercially available $Ca(OH)_2$ was employed as was commercially available $CaO.Al_2O_3$ with the latter being employed as a refractory cement. The synthesis in each case was carried out at room temperature by mixing the reactives with approximately 10 times their weight of water in suitable sealed containers. Their reaction occurred more rapidly if the contents of the containers were stirred or agitated. Optionally, if desired, grinding media such as Zirconia media, for example, may be placed in the containers.

The nitrate chloride sequestering compound $3CaO.Al_2O_3.Ca(NO_3)_2.nH_2O$ wherein n=0 to 24 can be produced in the manner described in the foregoing two examples employing tri-calcium aluminate or mono-calcium aluminate and calcium hydroxide.

In using $3CaO.Al_2O_3$ as a starting material, the following process can be employed.

(a) $3CaO.Al_2O_3 + Ca(NO_3)_2(aq) \xrightarrow{H_2O} 3CaO.Al_2O_3.Ca(NO_3)_2.nH_2O$ (b) $3CaO.Al_2O_3 + 2NaNO_3(aq) + Ca(OH)_2 \xrightarrow{H_2O} 3CaO.Al_2O_3.Ca(NO_3)_2.nH_2O + 2NaOH(aq)$ wherein n=0 to 24.

Employing $CaO.Al_2O_3$ as the starting material, the following process can be employed.

(a) $CaO.Al_2O_3 + Ca(NO_3)_2(aq) + 2Ca(OH)_2 \xrightarrow{H_2O} 3CaO.Al_2O_3.Ca(NO_3)_2.nH_2O$ (b) $CaO.Al_2O_3 + 2NaNO_3(aq) + 3Ca(OH)_2 \xrightarrow{H_2O} 3CaO.Al_2O_3.Ca(NO_3)_2.nH_2O + 2NaOH(aq)$ wherein n=0 to 24.

The presence NaOH does not appear to interfere with sequestration of chloride or with the action of nitrite on steel and, as a result, it is not necessary to remove the NaOH by washing the product compounds. Alternatively, the $3CaO.Al_2O_3.Ca(NO_3)_2.nH_2O$ and $Ca(NO_3)_2$ can be crystallized from the NaOH solution.

EXAMPLE 2

The phase $3CaO.Fe_2O_3.CaCl_2.nH_2O$ wherein n=10 has been created by reacting the precursors $3CaO.Fe_2O_3.Ca(NO_2)_2.nH_2O$ and $3CaO.Fe_2O_3.Ca(NO_3)_2.nH_2O$ with chloride. This indicates that chloride ions can be sequestered in the Fe analog of Friedel's salt ($3CaO.Al_2O_3.CaCl_2.10H_2O$). The compounds $3CaO.Fe_2O_3.Ca(NO_2)_2.nH_2O$ and $3CaO.Fe_2O_3.Ca(NO_3)_2.nH_2O$ have also been produced employing $2CaO.Fe_2O_3$ in the presence of supplementary Ca from $Ca(OH)_2$ and nitrite or nitrate from their calcium and/or sodium salts. $2CaO.Fe_2O_3$ may be produced by blending $Fe_2O_3$ and $CaCO_3$ in a molar ratio of about 2:1 followed by sintering this mixture at 1150° C. for approximately 1.5 hours. The mixture of CaO and $2CaO.Fe_2O_3$ is produced by calcining 3 moles of $CaCO_3$ with 1 mole of $Fe_2O_3$ at 1100° C. for approximately 1.5 hours. A variety of reaction times and temperatures can be used in the synthesis of this compound or this mixture. After cooling the $2CaO.Fe_2O_3$ or the mixture of $2CaO.Fe_2O_3$ and CaO were ground to an average particle size of approximately 10 microns using known comminution techniques.

EXAMPLE 3

The compounds $3CaO.Fe_2O_3.Ca(NO_3)_2.nH_2O$ may be produced by calcining 1 mole of $CaCO_3$ with 3 moles of $Fe_2O_3$ at 1100° C. for about 1.5 hours. This produces a mixture of CaO and $2CaO.Fe_2O_3$. This mixture is then ground and reacted with either $NaNO_3$ or $Ca(NO_3)_2$ under basic conditions. In the event that $NaNO_3$ is used, it is preferred to add supplemental calcium. This may be added as CaO or $Ca(OH)_2$ for example.

With respect to compound $3Me(II)O.R_2O_3.Me(II)(anion)_2.nH_2O$ wherein $R_2$ is $Al_2$, $Fe_2$ or $Cr_2$ anion is $NO_2$, $NO_3$ or OH and n is 0 to 24 where Me(II) is a cation such as Ca, but may be partially substituted by other divalent cations or may be completely substituted by other divalent cations such as Ba, Sr, Mn, Zn, for example. For some compositions divalent anions such as carbonate or borate may be used.

It will be appreciated, therefore, that the present invention has provided an effective method and related compounds and structure for incorporating into concrete containing metal elements a class of compounds which will effectively resist undesired corrosion of the metallic compounds by both sequestration of chloride ions and provide a coating on the metallic elements, in some instances such as reactions that release nitrite. Other reactions, such as those which release nitrate alone, occur without providing such a coating.

It will be appreciated that the compositions of the present invention may be combined with fresh concrete as defined herein in many ways. For example, the composition may be combined in solid form (a) with concrete in a plastic state (b) with ready mix concrete at a job site (c) at the time of batching or (d) inter-blended with mineral admixtures of materials such as slag, fly ash, or silica fume, or (e) may be interblended with cement, for example. It may also be combined in slurry form in a suitable liquid such as $Ca(OH)_2$ solution at the time of batching, for example. These approaches are all within the scope of the present invention.

Certain preferred compounds have been disclosed herein, along with their method of use and resultant structure.

Whereas particular embodiments have been described herein for purposes of illustration, it will be evident to those skilled in the art that numerous variations of the details may be made without departing from the invention as defined in the appended claims.

What is claimed is:

1. A method of resisting corrosion of metals in concrete comprising,
   introducing into fresh concrete having metal elements at least one compound capable of sequestering chloride ions selected from the group consisting of $3Me(II)O.R_2O_3.Me(II)(anion)_2.nH_2O$ where n=0 to 24 and $3Me(II)O.R_2O_3.Me(II)(anion)—nH_2O$ where n=0 to 18,
   wherein Me(II) is one or more cations selected from the group consisting of Ca, Ba, Sr, Mn and Zn; $R_2$ is $Al_2$, $Fe_2$ or $Cr_2$;
   anion is $NO_2$, $NO_3$, $CO_3$, $BO_4$, or OH, but when $R_2$ is $Al_2$, then Me(II) is not Ca; and
   allowing said concrete to set.
2. The method of claim 1 wherein
   said compound establishes a corrosion resistant oxide layer on embedded metal elements.
3. The method of claim 1
   wherein said chloride sequestration results in a chloride-containing compound having low solubility in said concrete.
4. The method of claim 3 including
   employing a nitrite-containing compound as said compound.

5. The method of claim 1 including
   introducing said compound to fresh concrete in an amount of about 3 to 88 pounds of particulate solid per cubic yard of hydrated fresh concrete.
6. The method of claim 2 wherein said
   metal elements are made of steel.
7. The method of claim 2 including
   employing as said compound, a compound capable of liberating nitrite ions.
8. A method of resisting corrosion of metals in concrete comprising introducing into fresh concrete having metal elements at least one compound capable of sequestering chloride ions wherein said compound is selected from the group consisting of $3CaO.Fe_2O_3.Ca(NO_2)_2.nH_2O$; and $3CaO.Fe_2O_3.Ca(NO_3).nH_2O$ wherein n=0 to 24.
9. The method of claim 1 wherein
   said metal elements are embedded reinforcing elements.
10. The method of claim 1 including
    introducing said compound as slurry.
11. The method of claim 1 including
    effecting said compound introduction into ingredients of said concrete prior to creating said fresh concrete.
12. The method of claim 1 including
    effecting said compound introduction by mixing said compound in dry form with cement in dry form and subsequently adding water to said compound and cement mixture.
13. The method of claim 12 including
    adding other ingredients to said mixture prior to adding said water.
14. The method of claim 2 wherein
    the following reaction sequesters the chloride ion and establishes said corrosion resistant oxide layer
    $3CaO.Fe_2O_3.Ca(NO_2)_2.nH_2O+2Cl^- \rightarrow 3CaO.Fe_2O_3.CaCl_2.nH_2O+2NO_2^-$ wherein n=0 to 24.
15. A method of resisting corrosion in concrete containing metal elements comprising,
    introducing at least one compound capable of sequestering chloride ions selected from the group consisting of $3Me(II)O.R_2O_3.Me(II)(anion)_2.nH_2O$ where n=0 to 24 and $3Me(II)O.R_2O_3.Me(II)(anion).nH_2O$ where n=0 to 18 wherein Me(II) is one or more cations selected from the group consisting of Ca, Ba, Sr, Mn and Zn; $R_2$ is $Al_2$, $Fe_2$ or $Cr_2$; and anion is $NO_2$, $NO_3$, $CO_3$, $BO_4$, or OH, but when $R_2$ is $Al_2$, then Me(II) is not Ca; into at least one component employed in creating fresh concrete,
    employing said compound and component to establish fresh concrete having said metal elements therein, and
    allowing said concrete to set.
16. The method of claim 15 including
    effecting said introduction by admixing said compound with minerals to be employed to make said fresh concrete.
17. The method of claim 15 wherein
    said metal elements are composed of steel.

18. The method of claim 15 wherein the following reaction sequesters the chloride ion and establishes said corrosion resistant oxide layer:
$$3CaO \cdot Fe_2O_3 \cdot Ca(NO_2)_2 \cdot nH_2O + 2Cl^- = 3CaO \cdot Fe_2O_3 \cdot CaCl_2 \cdot nH_2O + 2NO_2^-$$
wherein n=0 to 24.

19. The method of claim 18 wherein said metal elements are composed of steel.

20. The method of claim 15 including employing the following reaction in sequestering said chloride ions:
$$3CaO \cdot Fe_2O_3 \cdot Ca(NO_2)_2 \cdot nH_2O + 2Cl^- \rightarrow 3CaO \cdot Fe_2O_3 \cdot CaCl_2 \cdot nH_2O + 2NO_2^-$$
where n=0 to 24.

21. The method of claim 1 including employing the following reaction in sequestering said chloride ions:
$$3CaO \cdot Fe_2O_3 \cdot Ca(NO_2)_2 \cdot nH_2O + 2Cl^- \rightarrow 3CaO \cdot Fe_2O_3 \cdot CaCl_2 \cdot nH_2O + 2NO_2^-$$
where n=0 to 24.

* * * * *

UNITED STATES PATENT AND TRADEMARK OFFICE
CERTIFICATE OF CORRECTION

PATENT NO.   : 6,610,138 B1                                       Page 1 of 1
DATED        : August 26, 2003
INVENTOR(S)  : Paul W. Brown It is certified that error appears in the above-identified patent and that said Letters Patent is hereby corrected as shown below:

Column 1,
Line 41, "sea walls," should read -- sea walls. --.

Column 7,
Line 49, "(anion)–" should read -- (anion). --.

Signed and Sealed this

Sixteenth Day of December, 2003

JAMES E. ROGAN
*Director of the United States Patent and Trademark Office*